Sept. 4, 1934.  H. E. K. POHL  1,972,244
INVERTED FLOAT STEAM TRAP
Filed June 13, 1932
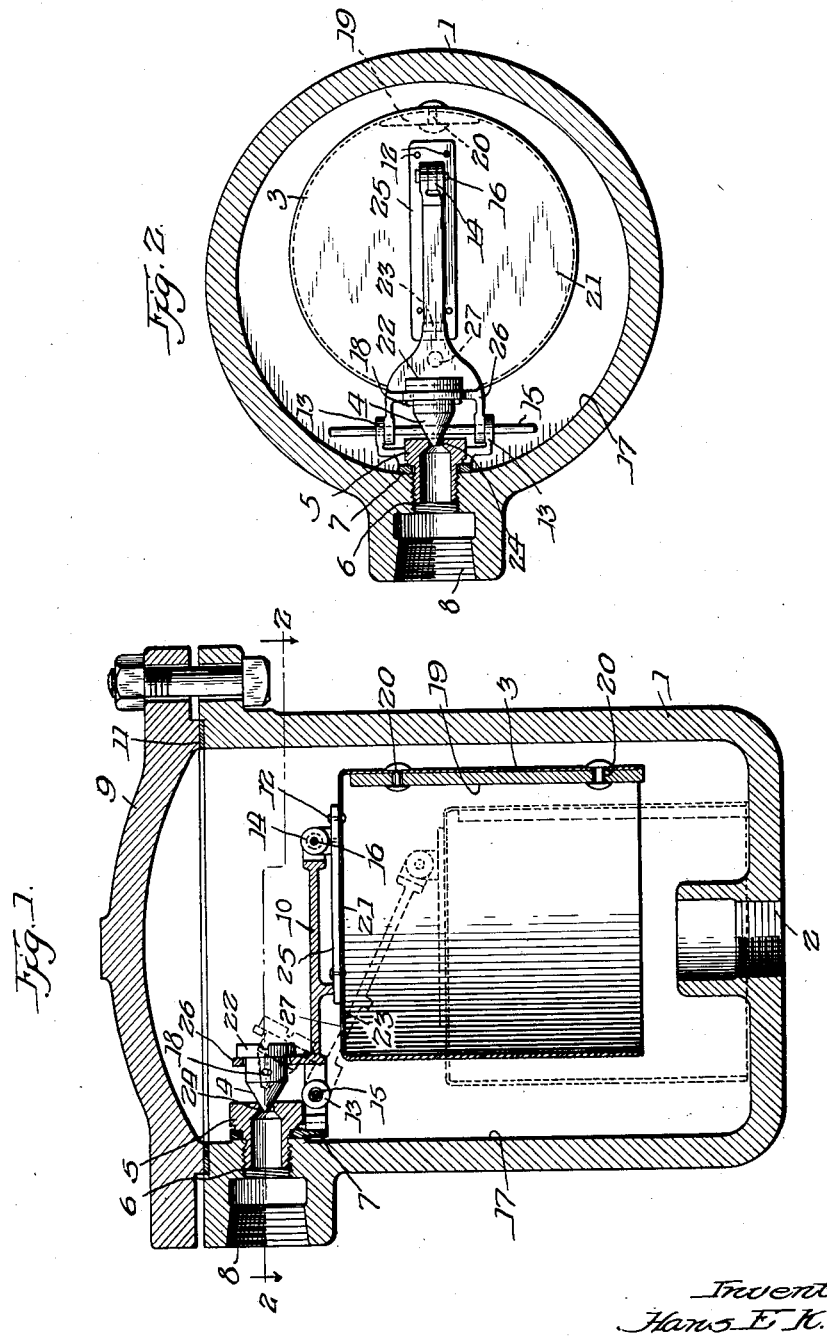

Patented Sept. 4, 1934

1,972,244

UNITED STATES PATENT OFFICE 1,972,244

INVERTED FLOAT STEAM TRAP

Hans E. K. Pohl, River Forest, Ill., assignor to Crane Co., Chicago, Ill., a corporation of Illinois Application June 13, 1932, Serial No. 616,766

5 Claims. (Cl. 137—103)

This invention pertains to an improved inverted open float type of steam trap which is used for collecting and disposing of the water of condensation of heating coils, pressure piping, and the like.

For one of the principal objects of this invention, the center of gravity is shifted from the center of the float to the side of the float thereby obtaining increased leverage, and thus provide greater pulling power for the same size of float, than heretofore available.

In addition, this invention eliminates the use of the troublesome compound levers, and provides a very compact arrangement and also simplifies the working parts used.

Another object of this invention is to maintain the float in such position, whereby positive venting results, because that portion of the float which contains the vent hole is positioned at the highest level.

This invention also provides a construction in which the rebounding ordinarily resulting when the float is snapped into its movement by pressure, from discharging position to the closing position of the valve, is prevented.

A better understanding of the objects and advantages of this construction will be apparent from the attached drawing, in which Fig. 1 is a sectional assembly view taken on the centerline.

Fig. 2 is a plan sectional view taken on the line 2—2 of Fig. 1.

The trap body 1 serves as a container for the accumulation of condensation resulting from the entrance of steam through the inlet 2. The normal position, therefore, of the float 3 is as shown in solid lines in Fig. 1, when the disc 4 is in the seated position against the seat bushing 5. This seat bushing is held on the interior of the trap body preferably by screw threads 6 which also hold the fulcrum support 7 in position for the purpose of hinging the lever 10 at 13. This lever is hinged by a pin 15 which is made preferably long enough so as to occupy a substantial part of the interior arc of the chamber 17 in order to prevent it from slipping out at either end as shown in Fig. 2. The valve disc 4 is loosely pivoted within the lever member 26 by means of the pin 18, thus permitting relatively free rotation. A float hinge 25 is riveted to the float 3 and is pivoted to the forked end of the lever 10 as shown at 14 by a pin 16. It will be noted that the float is situated eccentrically or off center in relation to the end of the lever. In order to maintain the float 3 in a relatively balanced or even keeled position a metal strip 19 is used to obtain this condition.

It is a preferred object of this invention to permit a long lever arm in order to supply a substantially large discharge opening 24 in seat bushing 5 in comparatively small volume of space. When the disc member 4 is held in closed position as previously mentioned by reason of the pressure exerting against the same, the float with the off center lever arrangement has sufficient power to open the valve against said pressure. Each float is weighted according to the individual requirements for each size trap to open the valve against the highest pressure recommended for each size of trap. The entire interior chamber of the trap is made pressure tight by means of the cap 9, which is bolted or otherwise secured to the body of the trap maintaining a pressure tight joint by means of gasket 11 or a ring joint for high pressures.

In normal operation condensation enters the inlet 2 under pressure and flows into the chamber 17 of the trap around the float 3. At the same time condensation enters the float and compresses the air collected therein. As the water around the float rises to a higher level than in the float, it is evident that said float becomes buoyant and rises to the position as indicated by the full lines in Fig. 1 and closes the valve 4. Air being lighter than water will vent through the hole 27 provided for this purpose in the top of the float into the upper portion of chamber 17 and permit the condensate to rise in the float. When the condensate has risen in the float to a predetermined level its buoyance is removed and the float will sink. This operation pulls the disc 4 from the seat 24, thereby allowing the trap to discharge at 8 as indicated by the dotted lines. It will be readily apparent to those skilled in the art that for the opening operation pulling power is the most essential factor; that is, the float must be sufficiently weighted to be able to open the valve by means of leverage against the highest pressure.

It is further evident that the weight of the float must be so proportioned as to obtain proper buoyancy with the result that certain limitations are prevalent in the design of the float. The established float factor in combination with the lever, therefore, furnishes a fixed power for all pressures. The usual or conventional design of a trap of this type here discussed has a symmetrical float suspended from the end of the lever at its center of gravity and if a predetermined seat opening is required, likewise a corresponding power is necessary to open the valve against the pressure. It is at times necessary to employ a compound lever to obtain the desired results so as to maintain a compact trap design. This invention relates to an arrangement whereby the center of gravity has been shifted to one side of the float permitting, therefore, a simple lever and thus obtaining equal power which otherwise must have been obtained with a compound lever for the same compactness of trap design. To further improve the action of the mechanism a stop or lug 23 is so arranged on the lever 10 to serve a twofold purpose; namely, first, it permits the float to vent properly through the vent hole 27 provided on the float when condensation enters the trap at the inlet 2; second, it stops any undue rebound caused by the float when the trap has discharged and said float suddenly rises to its upmost position and closes the valve. The closing of the valve is dependent upon the buoyancy of the float, and after being closed the disc is held in place by the pressure, whereas the float is ready again to receive condensation for the next discharge. It should be understood that the discharge of condensate by reason of the steam pressure behind it is continuous until the buoyancy of the float is again restored by reason of the removal of the condensate from the float by steam, air, or non-condensible gases. The air and non-condensible gases will vent through the float as previously described, whereas the steam has a tendency to condense in the float. As long as no further condensate except steam enters the float, said float will remain in buoyant position and consequently the valve is kept closed by the pressure.

By reason of the simple lever mechanism and float arrangement, I am enabled to obtain the maximum amount of force to act against the pressure exerted on the seat bearing 24. It is obvious that such pressure can be easily calculated by simply multiplying the area of the discharge orifice 24 times the pressure in the pipe line in pounds per square inch. This product must be equal to or less than the weight of the float multiplied by the distance of the lever centers 15 and 16.

It is obvious that many changes may be made in the details of the construction and design without departing from the spirit and scope of this invention as defined in the claims appended hereto.

1. In a condensation trap, comprising a hollow body, provided with an inlet and an outlet, an inverted hollow float therebetween, a cap for said body, the said outlet being located in the upper side wall of said hollow body, and being provided with a renewable threaded bushing serving as a valve seat, a valve closure therefor, loosely connected to a horizontal lever, the latter being pivotally connected at its outer end to the said upper side wall, at a point below said outlet opening, the said float being pivotally secured at its upper end to the inner terminus of said horizontal lever, the connection to said float being at a point beyond the vertical axis of said float, and diametrically opposite said outlet, the float being weighted on the side adjacent to said latter pivoted connection.

2. In a condensation trap, comprising a hollow body provided with an inlet and an outlet, an inverted hollow float therebetween, a cap for said body, the said outlet being located in the upper side wall of said hollow body, and being provided with a renewable bushing serving as a valve seat, a rotatable valve closure therefor, loosely connected to a horizontal lever, the latter being pivotally connected at its outer end to the said upper side wall, at a point below said outlet opening, the said float being pivotally secured at its upper end to the inner terminus of said horizontal lever, the connection to said float being at a point beyond the vertical axis of said float, and diametrically opposite said outlet, the float being weighted on the side adjacent to said latter pivotal connection.

3. In a condensation trap, comprising a hollow body provided with an inlet and an outlet, an inverted hollow float therebetween, a cap for said body, the said outlet being located in the upper side wall of said hollow body, and being provided with a renewable threaded bushing serving as a valve seat, a valve closure therefor, loosely connected to a horizontal lever, the latter being pivotally connected at its outer end to the said upper side wall, at a point below said outlet opening, the said float being pivotally secured at its upper end to the inner terminus of said horizontal lever, the connection to said float being at a point beyond the vertical axis of said float, and at the center of gravity of said float, the latter being weighted at any location adjacent to the said pivotal connection, to accomplish the transfer of said normal center of gravity of the float.

4. In a condensation trap, comprising a hollow body provided with an inlet and an outlet, an inverted hollow float therebetween, a cap for said body, the said outlet being located in the upper side wall of said hollow body, and being provided with a renewable bushing serving as a valve seat, a valve closure member therefor, loosely connected to a horizontal lever, the latter being pivotally connected at its outer end to the said upper side wall, at a point below said outlet opening, the underside of said lever being provided with a downwardly projecting stop, said stop contacting with the upper side of said float when the latter is at its maximum limit travel and simultaneous with said valve closure being in its closed position, the said float being pivotally secured at its upper end to the inner terminus of said horizontal lever, the connection to said float being at a point beyond the vertical axis of said float, and diametrically opposite said outlet, the float being weighted on the side adjacent to said latter pivotal connection.

5. In a condensation trap, comprising a hollow body provided with an inlet and an outlet, the latter being located at the upper end thereof, a hollow float therefor between said inlet and outlet, a cap for said body, said outlet being provided with a renewable bushing serving as a valve seat, a valve closure therefor, loosely connected to a substantially horizontal lever, the latter being pivotally connected at its outer end to the upper side wall of said hollow body, at a location below said outlet, the said float being pivotally secured at its upper end to the inner terminus of said horizontal lever, the connection to said float being at a point beyond the vertical axis of said float, and opposite said outlet, the float being weighted on the side adjacent to said latter pivoted connection.

HANS E. K. POHL.